United States Patent [19]

Sasaki et al.

[11] Patent Number: 4,858,952
[45] Date of Patent: Aug. 22, 1989

[54] DOOR CHECKER FOR SEAT BELT REACHER SYSTEM

[75] Inventors: Kiichi Sasaki, Saitama; Tadanori Honda, Tochigi; Hidetoshi Saruwatari, Tochigi; Kazuo Higuchi, Tochigi, all of Japan

[73] Assignee: Honda Giken Kogyo Kabushiki Kaisha, Tokyo, Japan

[21] Appl. No.: 766,092

[22] Filed: Aug. 14, 1985

[30] Foreign Application Priority Data

Aug. 23, 1984 [JP] Japan .................. 59-175695
Aug. 23, 1984 [JP] Japan .................. 59-175696
Aug. 23, 1984 [JP] Japan .......... 59-127996[U]

[51] Int. Cl.⁴ ............................................. B60R 21/02
[52] U.S. Cl. .................................. 280/802; 292/265
[58] Field of Search ................... 280/801, 802, 804; 292/265, 266, 275

[56] References Cited

U.S. PATENT DOCUMENTS

| | | | |
|---|---|---|---|
| 2,032,600 | 3/1936 | Smith | 292/266 |
| 2,268,976 | 1/1942 | Westrope | 292/275 |
| 4,211,431 | 7/1980 | Awano et al. | 280/804 |
| 4,213,637 | 7/1980 | Mauron | 280/804 |
| 4,451,061 | 5/1984 | Takada | 280/802 |

FOREIGN PATENT DOCUMENTS 506295 5/1939 United Kingdom ............... 292/265

Primary Examiner—John J. Love
Assistant Examiner—Ross Weaver
Attorney, Agent, or Firm—Lyon & Lyon

[57] ABSTRACT

A door checker which can be advantageously utilized for driving automotive equipment such as a seat belt reacher system in synchronization with the opening and closing action of the vehicle door. By appropriate arrangement of a spring and a taper in the door checker member, the force required to open and close the door is not unduly increased. By proper arrangement of the spring, the side thrust from the door checker member is always directed in one direction, whereby the structure for supporting the side thrust is simplified.

10 Claims, 3 Drawing Sheets

Fig. 3
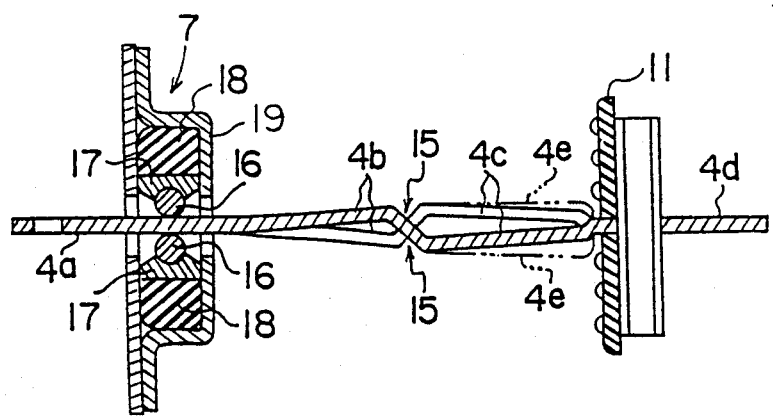
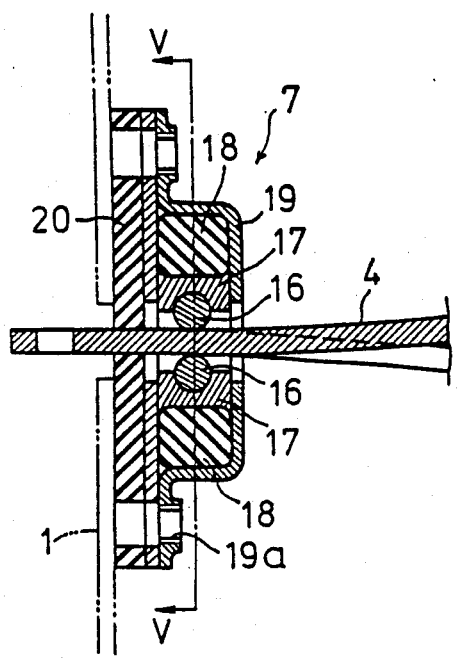
Fig. 4
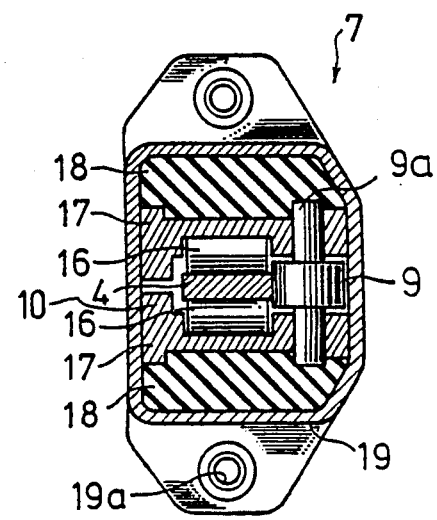
Fig. 5

DOOR CHECKER FOR SEAT BELT REACHER SYSTEM

This invention generally relates to a door checker for operating automotive equipment in an automobile by way of a control cable that connects an actuating means for the equipment to a free end of a door checker member and in particular to such a door checker which can advantageously drive a seat belt reacher system by way of the control cable in addition to effecting the normal function of a door checker.

A seat belt reacher system may be designed in a number of ways, but the one contemplated in this disclosure may be characterized in that a rotary arm carrying an end of a seat belt at its free end is driven, for instance, by a control cable having one end wound around a pulley secured to the base end of the rotary arm and the other end of the cable attached to the free end of the door checker member. In such a seat belt reacher system, the force applied to the door to close it is transmitted to the seat belt reacher system through the control cable to the rotary arm which is then rotated forwardly and presents the end of a seat belt that is attached to the free end of the rotary arm to a position near to the passenger so that the seat belt may be readily accessible to him and he may be encouraged to wear the seat belt when he has closed the door and is ready to start the car.

Such a seat belt reacher is highly desirable because, while the necessity of wearing a seat belt while driving is widely recognized, most public offices and private organizations have not been very successful in encouraging drivers and passengers to wear seat belts. It is therefore highly desirable in reducing the chance of injuries from car accidents to develop a seat belt reacher system which is comfortable for the passenger to use and both reliable and economical to encourage equipping cars with such a system.

In designing a seat belt reacher system which is practical enough to be commercially acceptable, one of the problems is to find a suitable means for driving the rotary arm which carries one end of the seat belt. A power source such as electric motors, pneumatic actuators and hydraulic actuators may be an obvious choice but it will increase the complexity of the system, thereby increasing the cost and reducing the reliability.

Under this circumstance, the inventors of this application have realized the advantage of using the motion of a door checker member as a means for driving a seat belt reacher system. As a matter of fact, the times for applying and removing a seat belt coincide with the times when the door is closed and opened, respectively, and the free end of a door checker member undergoes a certain motion whenever the door is opened or closed so that it may be used as a means for driving a seat belt reacher system.

In view of such shortcomings of prior art, a primary object of this invention is to provide a door checker which is advantageous for driving a seat belt reacher system.

Another object of this invention is to provide such a door checker which can additionally provide the function of a normal door checker in a satisfactory manner.

Yet another object of this invention is to provide such a door checker which will not unduly increase the force required to open and close the door.

Yet another object of this invention is to provide a door checker which is reliable and durable.

According to this invention, such objects are accomplished by providing a door checker which may be used as a drive source for automotive equipment, characterized in that: a generally L-shaped door checker member has a first end pivoted to a bracket fixed to the vehicle body, a cam portion which cooperates with a gripping means and is secured to a door, a corner portion and a second end which extends from the corner portion sideways away from the vehicle center and is connected to an end of a control cable whose other end is connected to the equipment to be driven. With such a door checker it is possible to activate, for instance, a seat belt reacher system upon closing and opening a door, thus requiring no external power source.

According to one aspect of the invention, an elastic means, such as a tension coil spring, is provided between the door checker member and the door so as to bias the door checker member relative to the door in a direction to close the door. This feature reduces the force required to close the door particularly when the door is near its fully closed state when the control cable presents the greatest load in activating, for instance, a seat belt reacher system.

According to yet another aspect of this invention, the door checker member is tapered in such a manner that the thickness of the door checker member is gradually reduced from a nodal point toward the portion corresponding to the fully opened door, whereby the increase in the force required to fully open the door due to the provision of the tension spring may be advantageously canceled.

According to yet another aspect of this invention the point of engagement between the tension spring and the door checker member is located opposite to the point of engagement of the control cable with the door checker member with respect to a line connecting a pivot point on the first end of the door checker member with a point of engagement of the tension spring with the door. According to such an arrangement, the door checker member applies a side thrust to the gripping means always in one direction, thereby simplifying the structure for supporting the side thrust.

According to yet another aspect of this invention, the cam portion includes a detent groove at its substantially middle point, whereby the door checker can perform the function of a conventional door checker as well.

Now this invention is described in the following in terms of specific embodiments with reference made to the attached drawings, in which;

FIG. 3 is a longitudinal sectional view of the main part of the door checker of FIG. 1 taken along the curving centerline of that main part.

FIG. 4 is a sectional view taken along line IV—IV of FIG. 1;

FIG. 5 is a sectional view taken along line V—V of FIG. 4;

Figure 1:
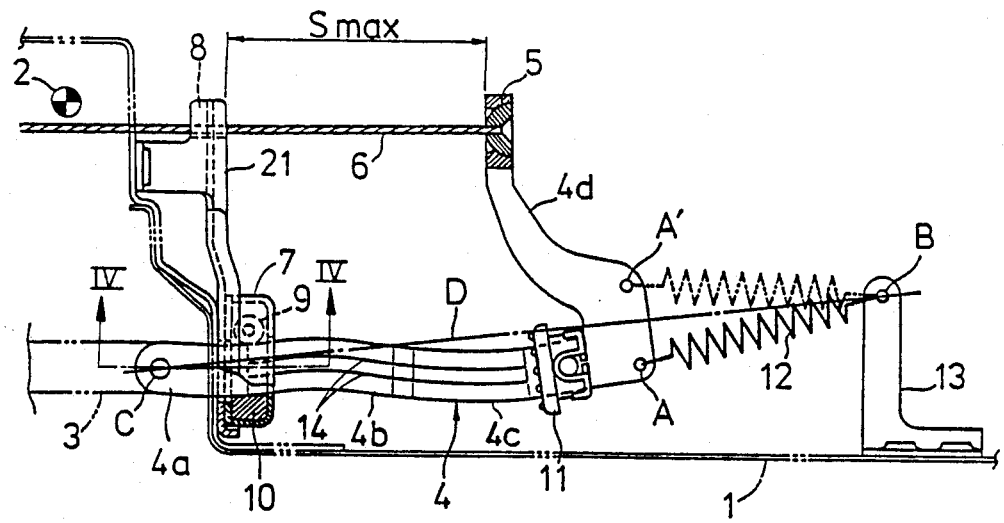
FIG. 1 is a plan view of an embodiment of the door checker according to this invention when the door is fully closed.

As shown in FIG. 1, a door checker member 4 according to this invention comprises an external end 4a protruding outwardly from the door panel 1, a first tapered portion 4b which is gradually increased in thickness towards a middle part, a second tapered portion 4c which is gradually reduced in thickness away from the middle part, and an internal end portion 4d which extends outwardly relative to the second tapered portion 4c in the shape of letter "L".

The external end portion 4a is pivoted, in a known manner, to a link 3 fixedly secured to the vehicle body. The internal end portion 4d the door checker member 4 is provided with a spherical receiving surface 5 at its free end so as to engage a spherical element on the end of a control cable 6. A guiding and gripping means 7 is fixedly secured to an internal surface of the door panel 1 so as to guide and grip the door checker member 4 from above and below in an elastic manner as will be described in greater detail hereinafter. A guide slot 8 is provided in the external end of an extension 21 of the gripping means 7 so as to guide the control cable 6. Numeral 11 denotes a stopper member made of rubber material provided on an end of the main body portion 4b of the checker member adjacent to the internal end portion 4d.

As shown in FIG. 1, bracket 13 is fixedly secured to the door panel 1 and a tension coil spring 12 is stretched between an engagement point B on a free end of the bracket 13 and an engagement point A provided in an intermediate point between the main body portion 4b and the internal end portion 4d of the door checker member 4. For a reason which will be explained later, the engagement point A is provided on the side opposite to the engagement point of the control cable 6 in relation to a line D connecting the pivotal center C on the external end portion 4a of the door checker member with the engagement point B of the tension coil spring 12.

As shown FIGS. 1 and 3, the first and the second tapered portions 4b and 4c are longitudinally split into a central portion and two side portions by slits 14 extending along the axial direction and the central portion and the two side portions are bent away from each other whereby the first and the second tapered portions 4b and 4c are formed. A detent groove 15 is defined between the first and the second tapered portions 4b and 4c on both sides and serves as a nodal point which, as in any conventional door checker member, temporarily holds the door in a half open position.

As most clearly shown in FIGS. 4 and 5, the guiding and gripping means 7 has a casing 19 and is mounted to door 1 by way of a rubber gasket 20 by fastening screws (not shown) threaded into threaded holes 19a provided in the casing 19. A pair of rubber blocks 18 are placed above and below in the casing 1 and resiliently urge rollers 16 supported in retainers 17 toward the door checker member from above and below to guide and grip the door checker member 4. Therefore, as the door checker member 4 travels horizontally through the gripping means 7, the function of a normal door checker member is produced owing to the shape of the door checker member.

Now, the operation of the door checker according to this invention is described in the following:

As shown in FIG. 1, when the door is fully closed, the control cable 6 is pulled to its maximum stroke "Smax" and the biasing force of the tension coil spring 12 applied to the control cable 6 and the internal end portion of the door checker member 4 assumes a relatively small value. The control cable 6 applies a counter-clockwise moment to the door checker member 4 about its pivotal center C, as shown in FIG. 1, but the main body portion 4b of the door checker member 4 is supported against the pivoting moment by a bearing roller 9 incorporated in the gripping means 7.

Figure 2:
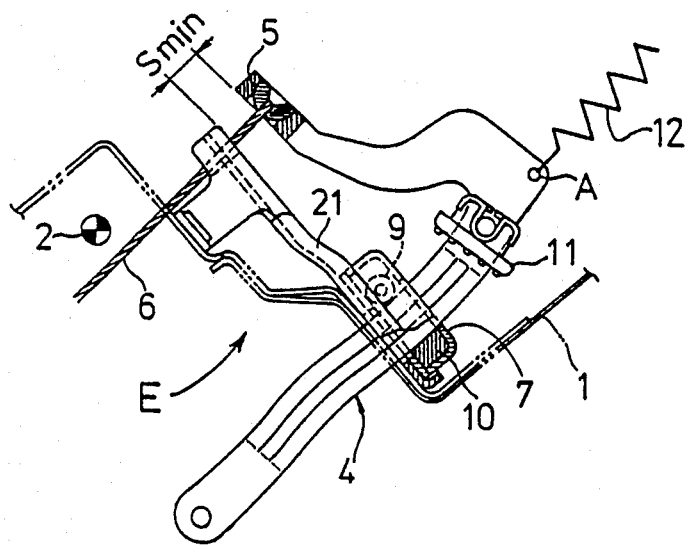
FIG. 2 is a view similar to FIG. 1 when the door is fully opened.

FIG. 2 shows the door in a fully opened state by being turned about its center of rotation 2 in the direction indicated by the arrow E, and the pulling stroke of the control cable 6, as pulled by the door checker member 4, is at or near its minimum "Smin". Since the driving force of the control cable 6 is necessary only when the door is near its fully closed state, when the door is fully opened as shown in FIG. 2, the pulling force of the control cable 6 is extremely small. At this time point, the pulling force of the tension coil spring 12 is at its maximum, but, since one end of the tension coil spring is engaged to the engagement point A, a moment of counter clockwise direction, as was the case in the previous instance, is applied to the door checker member 4 and the same bearing roller 9 supports the moment.

Therefore, in either case, the portion 10 of the gripping means 7 on the side opposite to the bearing roller 9 is not subjected to any load. However, if the end of the tension coil spring were engaged at a point A' which is located on the same side of the line D as the engagement point of the control cable 6, a moment of opposite direction will act upon the door checker member 4, particularly when the door is completely opened. If that were the case, a substantial load would have acted upon the portion 10, causing rapid wear in that portion. While it is possible to provide a structure similar to the bearing roller 9 in the portion 10, as will be described with respect to the modified embodiment of FIG. 8, it does complicate the structure of the main body of the gripping means 7 and may allow some play between the door checker member 4 and the rollers. Therefore, by engaging an end of the tension coil spring 12 to point A as shown in FIG. 1, the side thrust force produced from the moment applied to the door checker member 4 is always supported by the roller bearing 9 on one side, whereby the structure of the gripping means 7 is simplified and there will be very little play in the structure.

The control cable 6 and the tension coil spring 12 apply a moment to the door checker member 4 and the resultant side thrust from the door checker member 4 is supported by a bearing roller 9 which is provided in the gripping means in a freely rotatable manner on a vertical axis. As described above, according to this embodiment, because the moment acting upon the door checker member 4 is always counter-clockwise and the resultant side thrust is always directed to a same direction, the bearing roller 9 is necessary only on one side, as shown in FIG. 3. Shaft portions 9a of the bearing roller 9 can be conveniently supported in holes (unnumbered) provided in the retainers 17 that also support the rollers 16.

Figure 8:
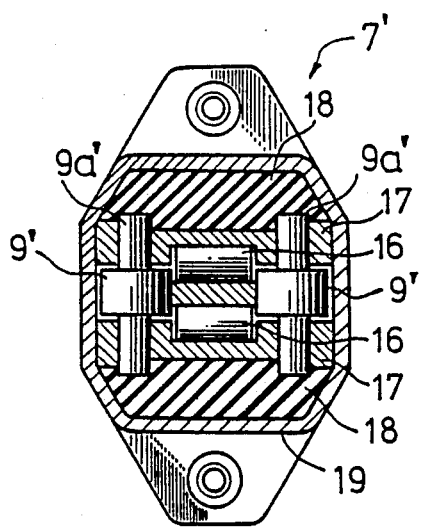
FIG. 8 is a sectional view similar to FIG. 5 illustrating a modified embodiment of the gripping means.

If the moment acting on the door checker member 4 is not always directed in the same direction for any reason, a pair of bearing rollers 9 and 9' are provided in the gripping means 7' on both sides, as shown in FIG 8. In this case also, shaft portions 9a, 9a' of the bearing rollers 9, 9' may be received in holes provided in the retainers 17.

Now the force required to open and close the door which incorporates a door checker according to this invention will be described in comparison with that required according to open and close a conventional door checker by reference to FIGS. 6 and 7.

In the structure shown in FIGS. 1 through 5, the force required to open and close the door is determined by (1) the tension of the cable 6; (2) the biasing force arising from the taper of the door checker member 4; and (3) the spring force of the tension spring 12. The tension of the cable 6 consists of a door opening load which substantially linearly decreases from the maximum at the fully closed state of the door to zero at the ⅓ open state of the door in proportion to the opening angle of the door, as indicated by a solid line a in FIGS. 6 and 7. This is because the drive force transmitted by the cable 6 is necessary only when the door is near its fully closed state when it is pivoting the seat belt arm. The spring force of the tension spring 12 consists of a door closing load which substantially linearly increases from nearly zero at the fully closed state of the door to the maximum at the fully opened state of the door in proportion to the opening angle of the door, as indicated by a one-dot chain line c in FIGS. 6 and 7.

Figure 6:
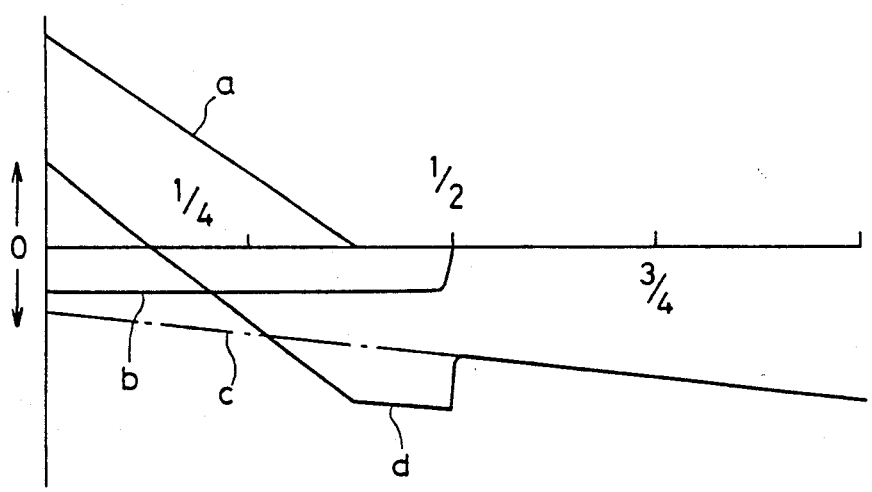
FIG. 6 is a graph showing the load acting upon the door when a conventional door checker is used.
Figure 7:
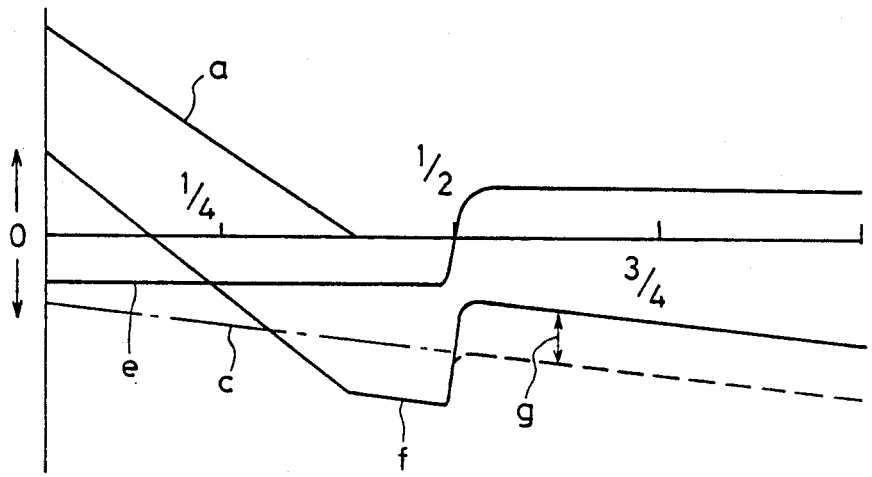
FIG. 7 is a graph similar to that of FIG. 6 when the door checker of this invention is used.

According to a conventional door checker member which has a portion 4e having a substantially uniform thickness, as indicated by an imaginary line in FIG. 3, instead of the second tapered portion 4c, the door checker member produces a door closing load of substantially uniform magnitude from the fully closed state of the door to the half open state of the door as indicated by a curve b in FIG. 6. Therefore, the combined force of these three components applies a door opening load to the door when the door is near its fully closed state, and, as the door is opened wider from its half closed state to its fully open state, the door closing load becomes increasingly more dominant until the load acting on the door is accounted for by the door closing load of the tension spring 12. This load from the tension spring 12 gradually increases as the door is opened wider and a force of a relatively great magnitude becomes necessary to open the door from its half open state to its fully opened state.

However, according to this invention, because the door checker member is tapered so that its thickness decreases from the nodal point in the middle towards the portion corresponding to the fully open state of the door, when the door is opened wider beyond its half open state, a door opening load is generated by the rollers 16 pressing upon the second tapered portion 4c. In other words, as shown in the graph of FIG. 7, of all the load applied to the door, the contributions from the tension of the cable 6 denoted by line a and the spring force of the tension spring 12 denoted by line b are no different from those given in FIG. 6, but, when the door checker of this invention is used, a door opening load of a substantially constant magnitude acts upon the door when the door is in any state between the half open state and the fully open state. Thus, the total force acting upon the door, as given by combining these contributions, is as indicated by the curve f, and this door closing force, as far as the range between the half open state and the fully open state is concerned is less than the total force given in FIG. 6 by an amount indicated by g in FIG. 7. Therefore, when the door is opened beyond its half open state, the door that incorporates the door checker of this invention can be opened with a force that is less by the amount g than a door incorporating a conventional door checker.

Although the present invention has been shown and described with reference to the preferred embodiments thereof, it should not be considered as limited thereby. Various possible modifications and alterations could be conceived of by one skilled in the art to any particular embodiment, without departing from the scope of the invention as defined by the claims.

What we claim is:

1. For use with a door hingedly mounted to a vehicle body, a door checker operable as an operating source for automotive equipment, comprising:

a generally L-shaped member on said door having a first end portion projecting from a hinge end of said door and being pivotally connected to a bracket fixed to said vehicle body, a cam portion provided at least on a side surface of said first end portion proximate to the exterior of said door, gripping means secured to said door adjacent said hinged end thereof cooperable with said cam portion, a second end portion laterally offset from said first end portion toward said door exterior and connected to said first end portion by a corner portion, a control cable having one end extending exteriorly of said door operably connecting the equipment to be operated, the other end of said cable extending interiorly of said hinge end of said door and connecting said second end portion of said member, and a tension spring connected between said corner portion of said member and the door so as to biased said member relative to the door in a direction to close the door, wherein the point of engagement between the tension spring and said member is located on a side opposite to the point of engagement of the control cable with said member with respect to a line extending between the pivotal connection of the bracket and the first end portion of said member with the point of connection of the tension spring with the door.

2. A door checker as defined in claim 1, wherein the gripping means comprises at least one vertical roller for supporting a side thrust of said member, 3. A door checker as defined in claim 2, wherein the cam portion of said member is tapered in such a manner that the thickness of said member is gradually reduced from a nodal point toward the portion corresponding to the fully opened door.

4. A door checker as defined in claim 3, wherein said member is defined into a middle portion and side portions by a pair of slits extending along length thereby, and the taper is formed by bending the middle portion and the side portions away from each other.

5. A door checker as defined in claim 4, wherein the cam portion includes a detent groove at its substantially middle point.

6. A door checker as defined in claim 5, wherein the gripping means has a pair of horizontal rollers biased towards the upper and lower surfaces of the cam portion of said member.

7. A door checker for a door on a vehicle for operating automotive equipment on the vehicle through a cable, comprising:

gripping means mounted on said door, a checker member having first means pivotally connected to the vehicle, second means extending laterally from said first means and third means of elongated shape grippable by said gripping means for controlling and checking opening of the door, means on said second means laterally offset from said third means for connecting said cable, and spring means connected between said door and said checker member for biasing the door in a closing direction, said spring means connecting said checker member laterally on an opposite side as said second means from said third means.

8. The door checker of claim 7 wherein said third means includes a slit along its elongated length with portions bent in opposite directions to form a tapered shape.

9. The door checker of claim 8 wherein said tapered shape reduces in dimension in both directions from the center along the elongated length with a nodal point near the center.

10. A door checker as in any one of the preceding claims in which the automotive equipment to be operated by the door checker is a seat belt reacher system.

* * * * *